US012791786B2

(12) United States Patent
Wang et al.

(10) Patent No.: US 12,791,786 B2
(45) Date of Patent: Nov. 10, 2026

(54) SPOT SIZE CONVERSION APPARATUS AND RELATED METHOD

(71) Applicant: HUAWEI TECHNOLOGIES CO., LTD., Guangdong (CN)

(72) Inventors: Shaowu Wang, Dongguan (CN); Chee Wei Lee, Shenzhen (CN); Qian Wang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 241 days.

(21) Appl. No.: 18/324,023

(22) Filed: May 25, 2023

(65) Prior Publication Data

US 2023/0296844 A1 Sep. 21, 2023

Related U.S. Application Data

(63) Continuation of application No. PCT/CN2021/132421, filed on Nov. 23, 2021.

(30) Foreign Application Priority Data

Nov. 28, 2020 (CN) ......................... 202011363533.8

(51) Int. Cl.
*G02B 6/122* (2006.01)
*G02B 6/124* (2006.01)
(Continued)

(52) U.S. Cl.
CPC ........... *G02B 6/1228* (2013.01); *G02B 6/124* (2013.01); *G02B 6/14* (2013.01); *G02B 6/305* (2013.01); *G02B 6/4207* (2013.01)

(58) Field of Classification Search
CPC ...... G02B 6/1228; G02B 6/124; G02B 6/305; G02B 6/14
See application file for complete search history.

(56) References Cited

U.S. PATENT DOCUMENTS 6,813,419 B2 * 11/2004 Matsushima ........ G02B 6/1228 385/124
6,931,180 B2 * 8/2005 Madsen ............... G02B 6/1228 385/88
(Continued)

FOREIGN PATENT DOCUMENTS

CN 202330786 U 7/2012
CN 102486550 B 4/2014
(Continued)

*Primary Examiner* — Michelle R Connelly
(74) *Attorney, Agent, or Firm* — Rimon PC

(57) ABSTRACT

A spot size conversion apparatus and a related device are provided. The spot size conversion apparatus includes a vertical spot size converter. The vertical spot size converter includes N geometric waveguides. A space between any two adjacent geometric waveguides is filled with a filling material. Each of the N geometric waveguides includes an incident surface and an emergent surface. The refractive index of the filling material is less than the refractive indices of the two adjacent geometric waveguides. Geometric feature sizes between respective incident surfaces and respective emergent surfaces of the N geometric waveguides gradually decrease in a first direction. The vertical spot size converter is configured to receive a first electromagnetic wave signal, perform vertical spot size processing on the first electromagnetic wave signal using the N geometric waveguides, and output a second electromagnetic wave signal.

20 Claims, 8 Drawing Sheets

(51) Int. Cl.

| | |
|---|---|
| ***G02B 6/14*** | (2006.01) |
| ***G02B 6/30*** | (2006.01) |
| ***G02B 6/42*** | (2006.01) |

(56) References Cited

U.S. PATENT DOCUMENTS

| | | | | |
|---|---|---|---|---|
| 7,260,293 | B1 * | 8/2007 | Gunn, III | G02B 6/124 385/37 |
| 9,897,754 | B2 * | 2/2018 | Zhou | G02B 6/122 |
| 9,915,783 | B2 * | 3/2018 | Fondeur | G02B 6/305 |
| 2002/0054738 | A1 | 5/2002 | Matsushima et al. | |
| 2003/0138216 | A1 * | 7/2003 | Shimoda | G02B 6/1228 385/50 |
| 2016/0109659 | A1 | 4/2016 | Jiang | |
| 2016/0291254 | A1 * | 10/2016 | Zhang | G02B 6/30 |
| 2017/0269301 | A1 * | 9/2017 | Fondeur | G02B 6/305 |

FOREIGN PATENT DOCUMENTS

| | | | |
|---|---|---|---|
| CN | 106154412 | A | 11/2016 |
| CN | 208060765 | U | 11/2018 |
| CN | 109655969 | A | 4/2019 |
| JP | 3084416 | B2 | 9/2000 |
| JP | 2005156674 | A | 6/2005 |

* cited by examiner

SPOT SIZE CONVERSION APPARATUS AND RELATED METHOD

CROSS-REFERENCE TO RELATED APPLICATIONS

This disclosure is a continuation of International Application No. PCT/CN2021/132421 filed on Nov. 23, 2021, which claims priority to Chinese Patent Application No. 202011363533.8 filed on Nov. 28, 2020. The disclosures of the aforementioned applications are hereby incorporated by reference in their entireties.

TECHNICAL FIELD

This disclosure relates generally to the field of optical communication, and in particular, to a spot size conversion apparatus and related method.

BACKGROUND

In an integrated optical chip, there is a requirement of spot size matching of an electromagnetic wave signal between two optical devices, for example, during exchange and coupling of an electromagnetic wave signal between an optical chip waveguide and an optical fiber. The requirement of spot size matching of an electromagnetic wave signal arises when there is a size difference between two adjacent waveguides. When an electromagnetic wave signal needs to be transmitted from a waveguide to another waveguide, the coupling efficiency between the two waveguides decreases if there is a spot size mismatch, and consequently there is a significant deterioration in signal strength of the electromagnetic wave signal in the transmission process. Therefore, spot size conversion of electromagnetic wave signal is a key technology when implementing high-efficient and low-loss optical chip integration.

Currently, there are mainly two approaches to implementing efficient coupling of the electromagnetic wave signal between the optical chip waveguide and the optical fiber. In one approach, a small spot-size thermally expanded core (TEC) fiber with a high refractive index difference is fused at an end of the optical fiber, to reduce a spot size at the end of the optical fiber, In another approach, a spot size expansion structure (SSC) is added at an end of the optical chip waveguide, to increase a spot size of the optical chip waveguide.

When spot size conversion is done at the end of the optical chip waveguide, a waveguide chip made of silicon or silicon nitride may use a grating coupler structure or an inverted taper-shaped spot size converter structure to effectively increase a spot size. However, such technique has the disadvantages such as low coupling efficiency, polarization dependence, and wavelength dependence. Therefore, how to improve coupling efficiency when transmitting an electromagnetic wave signal between different waveguides is an urgent problem that needs to be resolved.

SUMMARY

Embodiments of this disclosure provide a spot size conversion apparatus and related method, to improve coupling efficiency when transmitting an electromagnetic wave signal between transmission media of different sizes.

According to a first aspect, an embodiment of this disclosure provides a spot size conversion apparatus. The apparatus may include a vertical spot size converter. The vertical spot size converter includes N geometric waveguides. The space between any two adjacent geometric waveguides is filled with a filling material. Each of the N geometric waveguides includes an incident surface and an emergent surface. A refractive index of the filling material is less than the refractive indices of the two adjacent geometric waveguides. Geometric feature sizes between respective incident surfaces and respective emergent surfaces of the N geometric waveguides gradually decrease in a first direction. The vertical spot size converter is configured to receive a first electromagnetic wave signal, perform vertical spot size processing on the first electromagnetic wave signal by using the N geometric waveguides to output a second electromagnetic wave signal, and send the second electromagnetic wave signal to a first receiver. The vertical spot size processing includes vertical spot size expansion processing or vertical spot size reduction processing. An angle range of the incident angle or the emergent angle between the first electromagnetic wave signal and a first geometric waveguide in the N geometric waveguides is a first range. An angle range of the incident angle or the emergent angle between an electromagnetic wave signal output from each geometric waveguide and a next geometric waveguide is also the first range. The first range is between 0 degrees and 180 degrees and is not 90 degrees.

In embodiments of this disclosure, based on a structure of a spot size conversion apparatus in the conventional technology, the structures of a plurality of geometric waveguides included in a vertical spot size converter in the spot size conversion apparatus are improved, so that an incident angle or an emergent angle between an electromagnetic wave signal and any geometric waveguide is not equal to 90 degrees, to implement corresponding spot size processing on the input electromagnetic wave signal and reduce crosstalk of the electromagnetic wave signal. Specifically, the conventional vertical spot size converter includes a non-uniform grating array, and when the electromagnetic wave signal passes through the non-uniform grating array, both an incident angle and an emergent angle of the electromagnetic wave signal are 90 degrees. Therefore, each time the electromagnetic wave signal passes through a grating, a part of the electromagnetic wave returns to an incident waveguide, there is crosstalk of the electromagnetic wave signal, a phenomenon apparently caused by the electromagnetic wave returns. Consequently, the coupling efficiency of transmitting the electromagnetic wave signal between transmission media of different sizes is affected. However, in some embodiments of this disclosure, the spot size conversion apparatus includes the vertical spot size converter including the N geometric waveguides. The part between the any two of the N geometric waveguides is filled with the filling material. The refractive index of the filling material is less than the refractive indices of the any two adjacent geometric waveguides, and the geometric structure sizes of the N geometric waveguides gradually decrease in a same direction. Therefore, in a process in which an electromagnetic wave signal passes through the N geometric waveguides of the foregoing structure, the vertical spot size processing can be performed based on an actual requirement, to generate an electromagnetic wave signal that matches a receiving waveguide. In addition, the incident surface or the emergent surface of each of the N geometric waveguides is inclined with respect to a vertical tangent plane (a tangent plane in a direction perpendicular to a transmission direction of the electromagnetic wave signal) (that is, an incident angle or an emergent angle between the electromagnetic wave signal and any geometric waveguide is between 0 degrees and 180 degrees and is not 90 degrees). Therefore, when the electromagnetic wave signal is incident or emergent from the N geometric waveguides, a reflected signal of the electromagnetic wave signal does not return along an original path. In this way, the phenomenon that the electromagnetic wave returns is reduced, and accordingly the transmission of the original electromagnetic wave signal is not interfered with. In conclusion, according to the spot size conversion apparatus provided in this embodiment of this disclosure, the spot size processing can be effectively performed on the electromagnetic wave signal, and the phenomenon that the electromagnetic wave signal returns can be reduced. In this way, the coupling efficiency of the electromagnetic wave in different transmission media is improved.

In a possible implementation, when the first receiver is a first waveguide, the first waveguide comprises one or more of an optical fiber, a waveguide chip, an external waveguide, or a laser, and the apparatus further includes a horizontal spot size converter configured to: receive a third electromagnetic wave signal output from a second waveguide, and perform horizontal spot size expansion processing on the third electromagnetic wave signal, to output the first electromagnetic wave signal. The second waveguide comprises one or more of an optical fiber, a waveguide chip, an external waveguide, or a laser.

In some embodiments of this disclosure, based on the first aspect, after the corresponding vertical spot size processing is performed on the electromagnetic wave signal by using the vertical spot size converter, the electromagnetic wave signal is transmitted to the receiving waveguide. In this scenario, the spot size conversion apparatus in this application may further include the horizontal spot size converter. The horizontal spot size converter is configured to receive an electromagnetic wave signal output from an output waveguide, perform horizontal spot size expansion processing on the electromagnetic wave signal, and send an electromagnetic wave signal obtained after the horizontal spot size expansion processing to the vertical spot size converter for vertical spot size processing, so that the horizontal spot size processing and vertical spot size processing are separately performed on the electromagnetic wave signal output from the output waveguide, to generate an electromagnetic wave signal that matches a mode field of the receiving waveguide. In this way, the coupling efficiency of the electromagnetic wave in different transmission media is improved.

In a possible implementation, the horizontal spot size converter is a tapered waveguide whose width gradually increases in a transmission direction of the third electromagnetic wave, and the widest part of the tapered waveguide is connected to the vertical spot size converter.

In some embodiments of this disclosure, the horizontal spot size converter is a tapered waveguide whose width gradually increases in a transmission direction of the electromagnetic wave signal output from the output waveguide. After entering the tapered waveguide, the electromagnetic wave signal is correspondingly horizontally widened along a tapered structure whose width gradually increases. In addition, the widest part of the tapered waveguide is connected to the vertical spot size converter, so as to output the horizontally widened electromagnetic wave signal to the vertical spot size converter.

In a possible implementation, the first direction is a transmission direction of the first electromagnetic wave signal, and the vertical spot size converter is configured to perform the vertical spot size expansion processing on the received first electromagnetic wave signal by using the N geometric waveguides, to generate the second electromagnetic wave signal.

In embodiments of this disclosure, when the geometric feature sizes of the N geometric waveguides gradually decrease in a transmission direction of the electromagnetic wave signal obtained after the horizontal spot size expansion processing, after the vertical spot size converter receives the electromagnetic wave signal obtained after the horizontal spot size processing, the electromagnetic wave signal obtained after the horizontal spot size processing passes through the N geometric waveguides, to perform vertical spot size expansion processing on the electromagnetic wave signal, and when the electromagnetic wave signal is incident or emergent from the N geometric waveguides, a reflected signal of the electromagnetic wave signal does not return along an original path. In this way, the phenomenon that the electromagnetic wave returns is reduced, and the coupling efficiency of the electromagnetic wave in different transmission media is improved.

In a possible implementation, the first electromagnetic wave signal is received, the first electromagnetic wave signal is output from a third waveguide, and the third waveguide comprises one or more of an optical fiber, a waveguide chip, an external waveguide, or a laser.

The spot size conversion apparatus in some embodiments of this disclosure may be applied to a plurality of scenarios. For example, the vertical spot size converter may receive an electromagnetic wave signal output from an optical fiber, a waveguide chip, an external waveguide, or a laser, and perform corresponding vertical spot size processing on the signal.

In a possible implementation, when the first receiver is a horizontal spot size converter, the horizontal spot size converter is configured to: receive the second electromagnetic wave signal output from the vertical spot size converter, and perform horizontal spot size reduction processing on the second electromagnetic wave signal, to output a third electromagnetic wave signal. The third electromagnetic wave signal is received by a fourth waveguide, and the fourth waveguide comprises one or more of an optical fiber, a waveguide chip, an external waveguide, or a laser.

In embodiments of this disclosure, based on the first aspect, after the corresponding vertical spot size processing is performed on the electromagnetic wave signal by using the vertical spot size converter, the electromagnetic wave signal is transmitted to the horizontal spot size converter. In this scenario, the horizontal spot size converter may be further configured to receive the electromagnetic wave signal obtained after the vertical spot size processing, perform horizontal spot size reduction processing on the electromagnetic wave signal, and send an electromagnetic wave signal obtained after the horizontal spot size reduction processing to the receiving waveguide, so that the vertical spot size processing and horizontal spot size processing are separately performed on the electromagnetic wave signal output from the output waveguide, to generate an electromagnetic wave signal that matches a mode field of the receiving waveguide. In this way, the coupling efficiency of the electromagnetic wave signal in different transmission media is improved.

In a possible implementation, the horizontal spot size converter is a tapered waveguide whose width gradually decreases in a transmission direction of the second electromagnetic wave, and the widest part of the tapered waveguide is connected to the vertical spot size converter.

In embodiments of this disclosure, the horizontal spot size converter is a tapered waveguide whose width gradually decreases in a transmission direction of the electromagnetic wave signal obtained after the vertical spot size processing. After the electromagnetic wave signal enters the tapered waveguide, corresponding horizontal spot size reduction is performed along a tapered structure whose width gradually decreases. In addition, the widest part of the tapered waveguide is connected to the vertical spot size converter, to receive the electromagnetic wave signal that is obtained after the vertical processing and that is output from the vertical spot size converter.

In a possible implementation, the first direction is an opposite direction of a transmission direction of the first electromagnetic wave signal, and the vertical spot size converter is configured to perform the vertical spot size reduction processing on the received first electromagnetic wave signal by using the N geometric waveguides, to generate the second electromagnetic wave signal.

In embodiments of this disclosure, when the geometric feature sizes of the N geometric waveguides gradually increase in a transmission direction of the electromagnetic wave signal output from the output waveguide, after the vertical spot size converter receives the electromagnetic wave signal output from the output waveguide, the electromagnetic wave signal passes through the N geometric waveguides, to perform vertical spot size reduction processing on the electromagnetic wave signal, and when the electromagnetic wave signal is incident or emergent from the N geometric waveguides, a reflected signal of the electromagnetic wave signal does not return along an original path. In this way, the phenomenon that the electromagnetic wave returns is reduced, and the coupling efficiency of the electromagnetic wave in different transmission media is improved.

In a possible implementation, the thickness of the horizontal spot size converter and that of the vertical spot size converter are the same.

In some embodiments of this disclosure, the horizontal spot size converter may perform horizontal spot size processing on the electromagnetic wave, the vertical spot size converter may perform vertical spot size processing on the electromagnetic wave, and the horizontal spot size converter and the vertical spot size converter have the same thickness. In this way, spot size processing can be performed on the electromagnetic wave, and the horizontal spot size converter and the vertical spot size converter may be simultaneously manufactured by using a semiconductor process, to reduce manufacturing difficulty.

According to a second aspect, an embodiment of this disclosure provides a spot size conversion apparatus. The apparatus may include M vertical spot size converters and M horizontal spot size converters. Each of the M vertical spot size converters is the vertical spot size converter according to any one of the foregoing implementations, and each of the M horizontal spot size converters is the horizontal spot size converter according to any one of the foregoing implementations.

In some embodiments of this disclosure, the spot size conversion apparatus may include a plurality of horizontal spot size converters and a plurality of vertical spot size converters, and may simultaneously perform, based on an actual requirement, corresponding spot size processing on a plurality of electromagnetic wave signals output from an output waveguide array. In this way, the coupling efficiency of the electromagnetic wave in different transmission media is improved.

According to a third aspect, an embodiment of this disclosure provides a spot size conversion method. The method may include: a vertical spot size converter receives a first electromagnetic wave signal, performs vertical spot size processing on the first electromagnetic wave signal by using N geometric waveguides, to output a second electromagnetic wave signal, and sends the second electromagnetic wave signal to a first receiver. The vertical spot size processing includes vertical spot size expansion processing or vertical spot size reduction processing. The vertical spot size converter includes the N geometric waveguides. A part between any two adjacent geometric waveguides is filled with a filling material. Each of the N geometric waveguides includes an incident surface and an emergent surface. A refractive index of the filling material is less than the refractive indices of the two adjacent geometric waveguides. The geometric feature sizes between respective incident surfaces and respective emergent surfaces of the N geometric waveguides gradually decrease in a first direction. An angle range of an incident angle or an emergent angle between the first electromagnetic wave signal and a first geometric waveguide in the N geometric waveguides is a first range. An angle range of an incident angle or an emergent angle between an electromagnetic wave signal output from each geometric waveguide and a next geometric waveguide is the first range. The first range is between 0 degrees and 180 degrees and is not 90 degrees.

In a possible implementation, when the first receiver is a first waveguide, the first waveguide comprises one or more of an optical fiber, a waveguide chip, an external waveguide, or a laser, and the method further includes: a horizontal spot size converter receives a third electromagnetic wave signal output from a second waveguide, and performs horizontal spot size expansion processing on the third electromagnetic wave signal, to output the first electromagnetic wave signal. The second waveguide comprises one or more of an optical fiber, a waveguide chip, an external waveguide, or a laser.

In a possible implementation, the horizontal spot size converter is a tapered waveguide whose width gradually increases in a transmission direction of the third electromagnetic wave, and the widest part of the tapered waveguide is connected to the vertical spot size converter.

In a possible implementation, the first direction is a transmission direction of the first electromagnetic wave signal, and the method includes: The vertical spot size converter performs the vertical spot size expansion processing on the received first electromagnetic wave signal by using the N geometric waveguides, to generate the second electromagnetic wave signal.

In a possible implementation, the first electromagnetic wave signal is received, the first electromagnetic wave signal is output from a third waveguide, and the third waveguide comprises one or more of an optical fiber, a waveguide chip, an external waveguide, or a laser.

In a possible implementation, when the first receiver is a horizontal spot size converter, the method includes: the horizontal spot size converter receives the second electromagnetic wave signal output from the vertical spot size converter, and performs horizontal spot size reduction processing on the second electromagnetic wave signal, to output a third electromagnetic wave signal. The third electromagnetic wave signal is received by a fourth waveguide, and the fourth waveguide comprises one or more of an optical fiber, a waveguide chip, an external waveguide, or a laser.

In a possible implementation, the horizontal spot size converter is a tapered waveguide whose width gradually decreases in a transmission direction of the second electromagnetic wave, and the widest part of the tapered waveguide is connected to the vertical spot size converter.

In a possible implementation, the first direction is an opposite direction of a transmission direction of the first electromagnetic wave signal, and the method includes: the vertical spot size converter performs the vertical spot size reduction processing on the received first electromagnetic wave signal by using the N geometric waveguides, to generate the second electromagnetic wave signal.

In a possible implementation, the thickness of the horizontal spot size converter and that of the vertical spot size converter are the same.

According to a fourth aspect, a semiconductor chip is provided, and includes the spot size conversion apparatus according to any one of the foregoing implementations.

According to a fifth aspect, a terminal device is provided, and includes the spot size conversion apparatus according to any one of the foregoing implementations.

DESCRIPTION OF EMBODIMENTS

Figure 1:
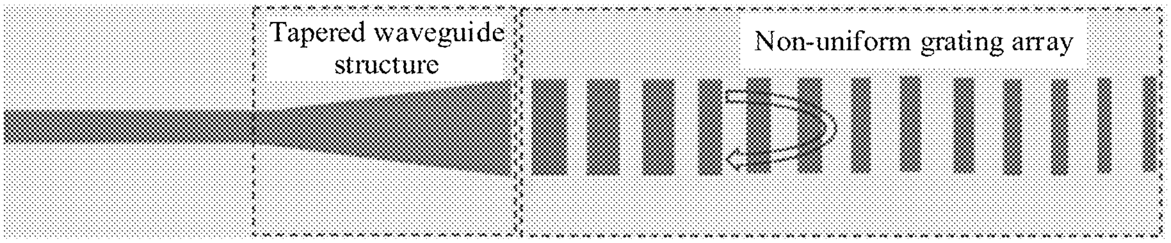
FIG. 1 is a schematic diagram of a non-uniform grating PLC waveguide spot size converter apparatus in the conventional technology.

Embodiments of this disclosure are described below with reference to the accompanying drawings in embodiments of this disclosure.

In this specification, claims, and accompanying drawings of this application, the terms “first”, “second”, “third”, “fourth”, and the like are used to distinguish between different objects, and are not used to describe a particular order. In addition, the terms “including” and “having” and any other variants thereof are intended to cover a non-exclusive inclusion. For example, a process, a method, a system, a product, or a device that includes a series of steps or units is not limited to the listed steps or units, but optionally further includes an unlisted step or unit, or optionally further includes another inherent step or unit of the process, the method, the product, or the device.

An “embodiment” in this specification means that a specific feature, structure, or characteristic described with reference to this embodiment may be included in at least one embodiment of this application. The phrase appearing at various locations in this specification does not necessarily refer to a same embodiment, and is not an independent or optional embodiment exclusive from another embodiment. It is explicitly and implicitly understood by persons skilled in the art that embodiments described in this specification may be combined with another embodiment.

The terms “component”, “module”, “system”, and the like used in this specification are used to represent computer-related entities, hardware, firmware, combinations of hardware and software, software, or software being executed. For example, a component may be but is not limited to a process that runs on a processor, a processor, an object, an executable file, an execution thread, a program, and/or a computer. As illustrated by using figures, both a computing device and an application that runs on the computing device may be components. One or more components may reside within a process and/or an execution thread, and a component may be located on one computer and/or distributed between two or more computers. In addition, these components may be executed from various computer-readable media that store various data structures. For example, the components may communicate by using a local and/or remote process based on a signal having one or more data packets (for example, data from two components interacting with another component in a local system, a distributed system, and/or across a network such as the Internet interacting with another system by using the signal).

Some terms in this application are first described, to facilitate understanding by persons skilled in the art.

(1) Planar lightwave circuit (PLC): the planar lightwave circuit is an optical waveguide located on a plane. A most common PLC splitter is made of silicon dioxide ($SiO_2$). Actually, a PLC technology involves a wide range of materials, for example, glass/silicon dioxide (Quartz/Silica/$SiO_2$), lithium niobate ($LiNbO_3$), III-V semiconductor compounds (for example, InP and GaAs), silicon-on-insulator (Silicon-on-Insulator, SOI/SIMOX), silicon nitride, silicon oxynitride (SiON), and macromolecular polymer (polymer).

(2) Spot size converter (SSC): a spot size converter is an optical device that connects two optical waveguides of different sizes and that performs mode field conversion. Existing fiber-waveguide couplers mainly include a grating coupler, a prism coupler, and a three-dimensional wedge converter.

(3) Laser diode (LD): a laser diode includes a single heterojunction (SH) laser diode, a double heterojunction (DH) laser diode, and a quantum well (QW) laser diode. The quantum well laser diode has advantages of a low threshold current and high output power. Compared with a laser, the laser diode has advantages of higher efficiency, a smaller size, and a longer service life; but the laser diode has lower output power (which is usually less than 2 mW), poorer linearity, and poorer monochromaticity.

(4) Transverse electric (TE) wave: a transverse electric wave is an electromagnetic wave that has no electric field component but has a magnetic field component in a propagation direction of the electromagnetic wave, and is briefly referred to as a TE wave. When a vertically polarized wave is obliquely incident on a surface of an ideal conductor, a synthesized wave is a transverse electric wave.

(5) Transverse magnetic (TM) wave: a transverse magnetic wave is an electromagnetic wave that has no magnetic field component in a propagation direction of the electromagnetic wave or has a magnetic field whose vibration direction that is perpendicular to a propagation direction of the wave and has an electric field component, and is referred to as a TM wave. When a parallel polarized wave is obliquely incident on a surface of an ideal conductor, a synthesized wave is a transverse magnetic wave. The transverse magnetic wave (TM wave) is one of guided electromagnetic waves and corresponds to a transverse electric wave (TE wave).

(6) Thermally expanded core (TEC) fiber jumper: when being coupled in free space, the thermally expanded core fiber jumper is not as sensitive to position offset as a single-mode optical fiber. In a fiber splicing technology, one end of a conventional single-mode optical fiber is heated to expand a fiber core longer than 2.5 mm, so as to manufacture such an optical fiber. In an application of coupling in the free space, the end of the optical fiber processed in this manner can receive a light beam with a large mode field diameter and can maintain single-mode and optical performance of the optical fiber. The TEC fiber is often used to construct a fiber-based optical isolator, a tunable wavelength filter, and a variable optical attenuator.

FIG. 1 is a schematic diagram of a non-uniform grating PLC waveguide spot size converter apparatus in the conventional technology. As shown in FIG. 1, the non-uniform grating PLC waveguide spot size converter apparatus includes a tapered waveguide structure whose width gradually increases and a cuboid non-uniform grating array structure whose width gradually decreases. Based on a low refractive index difference of the non-uniform grating PLC waveguide spot size conversion apparatus, a spot size conversion process of the non-uniform grating PLC waveguide spot size converter apparatus is as follows:

1. An electromagnetic wave signal enters the tapered waveguide structure from an output waveguide. When the electromagnetic wave signal enters the tapered waveguide structure, the electromagnetic wave signal is horizontally widened in a direction in which the width of the tapered waveguide structure gradually increases. It may be clearly learned from a mode field distribution diagram of the electromagnetic wave signal that the electromagnetic wave signal is horizontally widened.
2. The electromagnetic wave signal enters the non-uniform grating array structure from the tapered waveguide. As shown in FIG. 1, the non-uniform grating array in FIG. 1 includes a plurality of cuboid gratings whose widths gradually decrease and whose lengths and heights remain unchanged, and a part between cuboid gratings is correspondingly filled with a low-refractive-index filling material. After being horizontally widened, the electromagnetic wave signal enters the non-uniform grating array from the tapered waveguide. As shown in the figure, the electromagnetic wave signal first enters the low-refractive-index filling material, and then enters the cuboid grating. It should be noted that the electromagnetic wave is widened in the low-refractive-index filling material and is bound in the cuboid grating. As the widths of the cuboid gratings gradually decrease, the binding of the cuboid grating on the electromagnetic wave is weakened, and the electromagnetic wave signal is correspondingly widened in a vertical direction perpendicular to a plane of the non-uniform grating array. It may be learned from a mode field distribution diagram of the electromagnetic wave signal that the electromagnetic wave is vertically widened.
3. The electromagnetic wave signals enter a receiving waveguide. Compared with a mode field distribution diagram of the electromagnetic wave signal output from the output waveguide, the electromagnetic wave signal that enters the spot size converter is horizontally and vertically widened. As such, the spot size converter apparatus can implement spot size conversion of the electromagnetic wave in two directions.

Disadvantages of the non-uniform grating PLC waveguide spot size converter apparatus are as follows: in a process in which the electromagnetic wave signal passes through the non-uniform grating array, each time the electromagnetic wave signal passes through a grating, a part of the electromagnetic wave signal is reflected back to an incident waveguide, and interference occurs between reflected electromagnetic wave signals; and consequently an obvious phenomenon that the electromagnetic wave returns is caused. Return of the electromagnetic wave may cause crosstalk to a signal transmitted in a waveguide chip, and needs to be avoided as much as possible, especially in a signal transceiver chip.

In conclusion, according to an existing spot size conversion apparatus, when an electromagnetic wave is propagated in a spot size conversion apparatus, there is the phenomenon that the electromagnetic wave returns; and consequently strong interference to the electromagnetic wave signal is caused in a transmission process, and the coupling efficiency of transmitting the electromagnetic wave signal between different waveguides is reduced. This application provides an improved spot size conversion apparatus to solve the foregoing technical problems.

Figure 2:
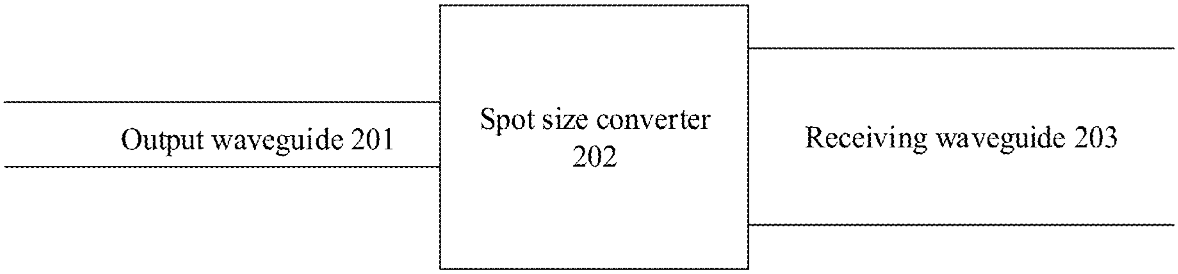
FIG. 2 is an architectural diagram of an electromagnetic wave communication system according to an embodiment of this disclosure.

Based on the foregoing description, a communication system on which an embodiment of this disclosure is based is first described below. FIG. 2 is an architectural diagram of a communication system according to an embodiment of this disclosure. The communication system may include an output waveguide 201, a spot size converter 202, and a receiving waveguide 203. The output waveguide 201 may be used as an output end of an electromagnetic wave signal. When the output waveguide 201 is used as an output end of an electromagnetic wave signal, the receiving waveguide 203 may be used as an input end of the electromagnetic wave signal. This is not specifically limited in this application.

The output waveguide 201 may be any structure used to transmit an electromagnetic wave signal, for example, a PLC waveguide chip, an optical fiber, a laser, a parallel slab waveguide, a rectangular waveguide, or a coaxial cable. In optical communication, a waveguide is a structure used to directionally guide an electromagnetic wave signal, so that the electromagnetic wave signal can be transmitted between endpoints of the waveguide. During the propagation of the electromagnetic wave signal, the waveguide may be divided into an internal region and an external region, and the electromagnetic wave signal is limited to the internal region with a high refractive index. For example, when the output waveguide 201 is a PLC waveguide chip, the electromagnetic wave signal may be transmitted in the waveguide chip, and may be transmitted to the receiving waveguide 203.

In this application, the spot size converter 202 is an optical device that connects the output waveguide 201 and the receiving waveguide 203 of different sizes and that performs mode field conversion. Common spot size converters include a grating coupler, a prism coupler, a three-dimensional wedge converter, and the like. For example, when the output waveguide 201 is a PLC waveguide chip, and the receiving waveguide 203 is an optical fiber, the two waveguides differ in size. In this case, if the electromagnetic wave signal is directly input from the PLC waveguide chip to the optical fiber, a high loss of the electromagnetic wave signal is generated at an interface, and there is coupling between the two waveguides due to a mode field mismatch. Therefore, the spot size converter 202 may be inserted between the PLC waveguide chip and the optical fiber, to effectively reduce a connection loss and a coupling loss caused due to the mode field mismatch. It should be noted that a specific structure of the spot size converter 202 in the communication system may be a spot size conversion apparatus 30 in FIG. 3 or a spot size conversion apparatus 100 in FIG. 10.

The receiving waveguide 203 may be any structure used to transmit an electromagnetic wave, for example, a PLC chip, an optical fiber, a laser, a parallel slab waveguide, a rectangular waveguide, or a coaxial cable. For example, when the receiving waveguide 203 is an optical fiber, and the output waveguide 201 is a PLC waveguide chip, after being output from the PLC waveguide chip, the electromagnetic wave signal enters the spot size converter and then enters the optical fiber. In this case, the spot size converter is inserted between the PLC waveguide chip and the optical fiber, and therefore the connection loss and the coupling loss caused due to the mode field mismatch can be reduced, and then the electromagnetic wave signal enters the optical fiber for transmission.

It may be understood that the architecture of the communication system in FIG. 2 is merely an example implementation in embodiments of this disclosure, and the communication system in some embodiments of this disclosure includes but is not limited to the foregoing communication system. It should be noted that the spot size converter 202 may be integrated into an optical communication device such as a waveguide chip, an optical fiber, or a single-port optical transceiver. For example, the spot size converter 202 is integrated into an optical fiber. When an electromagnetic wave signal is transmitted between a laser and the optical fiber, the laser is the output waveguide 201, the optical fiber is the receiving waveguide 203, and the spot size converter 202 in the optical fiber may process the electromagnetic wave signal, so that the electromagnetic wave signal can be better coupled to the optical fiber. For another example, the spot size converter 202 may be integrated into a single-port optical transceiver (which is also referred to as an optical modem). When an electromagnetic wave signal is transmitted between two optical fibers, the optical modem is configured to connect the two different optical fibers. In this case, an output optical fiber that inputs the electromagnetic wave signal to the optical modem is used as the output waveguide 201, a receiving optical fiber that receives the electromagnetic wave signal output from the optical modem is used as the receiving waveguide 203, and the spot size converter 202 in the optical modem may process the electromagnetic wave signal, so that the electromagnetic wave signal can be better coupled from the output optical fiber to the receiving optical fiber.

Based on the foregoing electromagnetic wave communication system and with reference to an embodiment of the spot size conversion apparatus provided in this application, the technical problem provided in this application is analyzed and resolved below.

Figure 3:
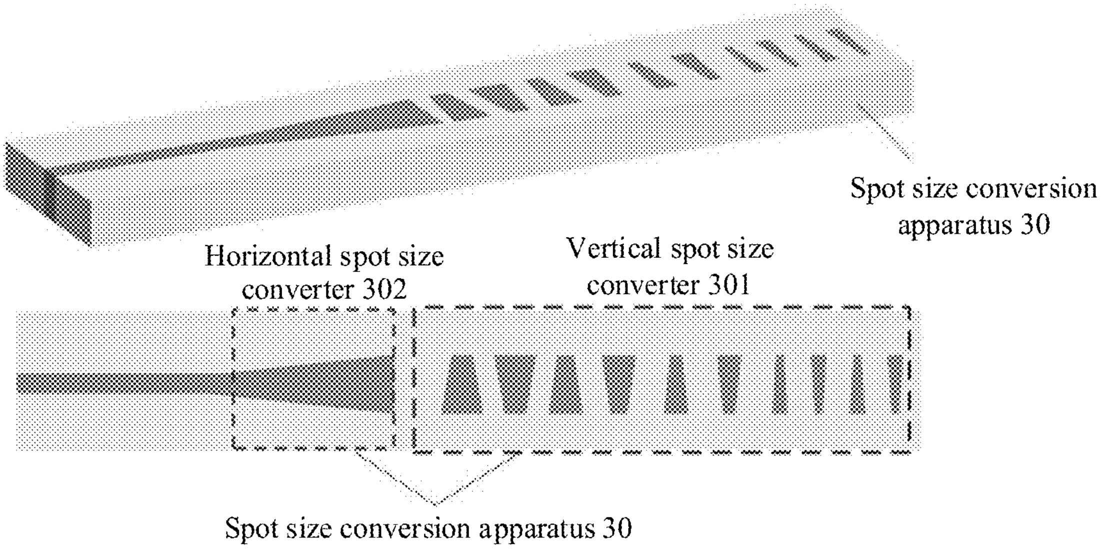
FIG. 3 is a diagram of a structure of a spot size conversion apparatus according to an embodiment of this disclosure.

FIG. 3 is a diagram of a structure of a spot size conversion apparatus according to an embodiment of this disclosure. As shown in FIG. 3, the spot size conversion apparatus 30 includes a vertical spot size converter 301, and optionally, may further include a horizontal spot size converter 302.

The vertical spot size converter 301 includes N geometric waveguides. A part between any two adjacent geometric waveguides is filled with a filling material. Each of the N geometric waveguides includes an incident surface and an emergent surface. A refractive index of the filling material is less than the refractive indices of the two adjacent geometric waveguides. The geometric feature sizes between respective incident surfaces and respective emergent surfaces of the N geometric waveguides gradually decrease in a first direction. The vertical spot size converter 301 is configured to: receive a first electromagnetic wave signal, perform vertical spot size processing on the first electromagnetic wave signal by using the N geometric waveguides, to output a second electromagnetic wave signal, and send the second electromagnetic wave signal to a first receiver. The vertical spot size processing includes vertical spot size expansion processing or vertical spot size reduction processing. An angle range of an incident angle or an emergent angle between the first electromagnetic wave signal and a first geometric waveguide in the N geometric waveguides is a first range. An angle range of an incident angle or an emergent angle between an electromagnetic wave signal output from each geometric waveguide and a next geometric waveguide is the first range. The first range is between 0 degrees and 180 degrees and is not 90 degrees.

Figure 4:
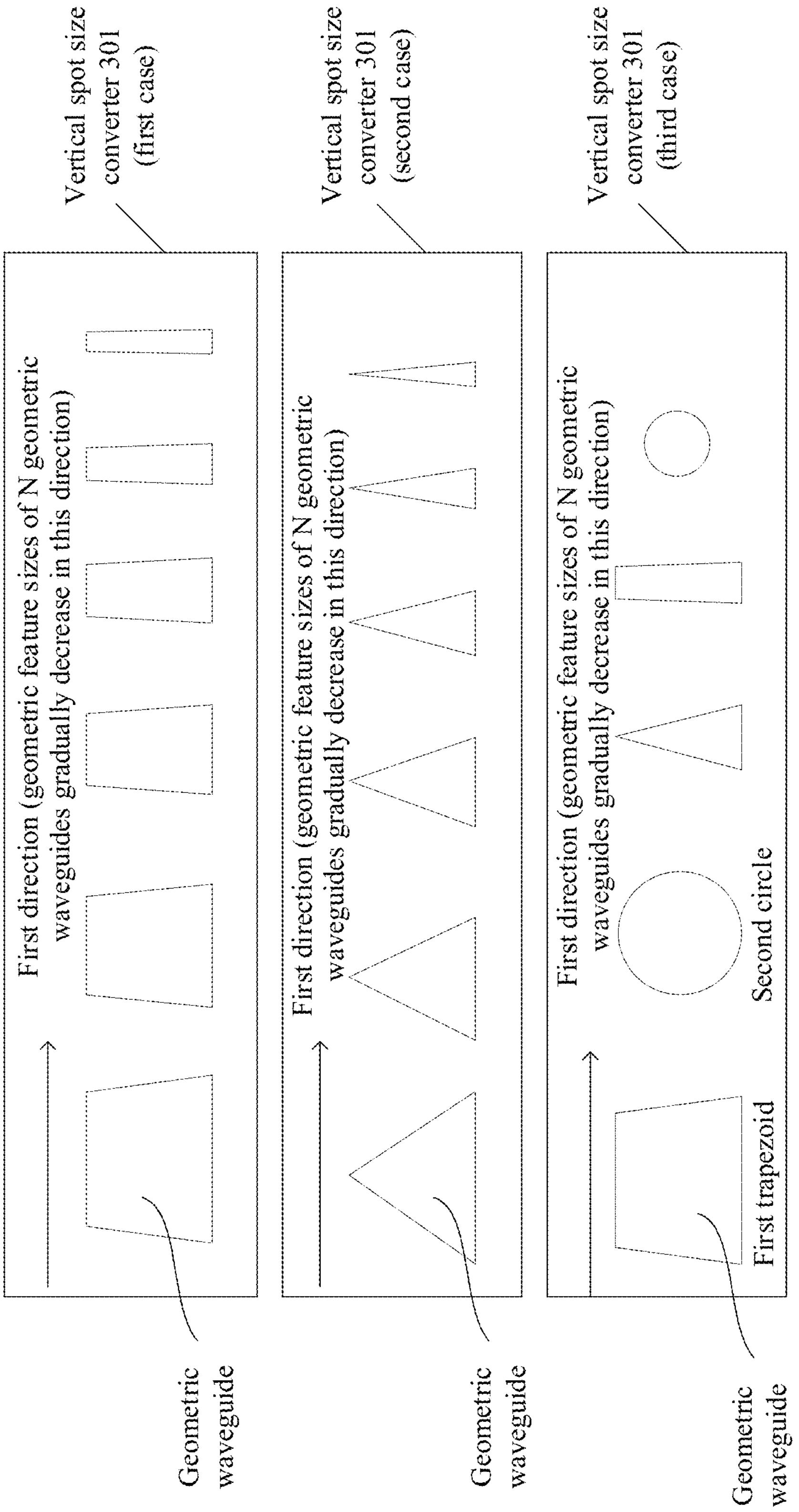
FIG. 4 is a schematic diagram of a vertical spot size converter according to an embodiment of this disclosure.

It should be noted that the shapes of cross-sections of the N geometric waveguides may be geometric shapes such as trapezoids, diamonds, circles, or triangles other than rectangles. Optionally, the cross-sections of the N geometric waveguides may differ in shape, but the cross-section of each of the N geometric waveguides is in a geometric shape such as a trapezoid, a diamond, a circle, or a triangle other than a rectangle. For example, FIG. 4 is a schematic diagram of a vertical spot size converter according to an embodiment of this disclosure. Three designs of the shapes of the cross-sections of the N geometric waveguides in the vertical spot size converters 301 are shown in the figure. In a first case, the shapes of the cross-sections of the N geometric waveguides are trapezoids, and the geometric feature sizes of the trapezoids gradually decrease in the first direction. In a second case, the shapes of the cross-sections of the N geometric waveguides are triangles, and geometric feature sizes of the triangles gradually decrease in the first direction. In a third case, the shapes of the cross-sections of the N geometric waveguides include a trapezoid, a circle, and a triangle, and geometric feature sizes of the cross sections of the geometric waveguides in the shapes gradually decrease in the first direction. In addition, all the geometric waveguides have a same thickness in the three cases. It should be noted that in the third case in FIG. 4, the cross-sectional areas of the geometric waveguides in the first direction gradually decrease. For example, an area of a first trapezoid is greater than an area of a second circle, and the thicknesses of the first trapezoidal waveguide and the second circular waveguide are the same.

In some embodiments of this disclosure, based on a structure of a spot size conversion apparatus in the conventional technology, the structures of a plurality of geometric waveguides included in a vertical spot size converter 301 in the spot size conversion apparatus are improved, so that an incident angle or an emergent angle between an electromagnetic wave signal and any geometric waveguide is not equal to 90 degrees, to implement corresponding spot size processing on the input electromagnetic wave signal and reduce crosstalk of the electromagnetic wave signal. Specifically, the conventional vertical spot size converter includes a non-uniform grating array, and in a process in which the electromagnetic wave signal passes through the non-uniform grating array, both an incident angle and an emergent angle of the electromagnetic wave signal are 90 degrees. Therefore, each time the electromagnetic wave signal passes through a grating, a part of the electromagnetic wave returns to an incident waveguide. There is crosstalk of the electromagnetic wave signal, which is caused by the phenomenon that the electromagnetic wave returns. Consequently, the coupling efficiency of transmitting the electromagnetic wave signal between transmission media of different sizes is affected. However, in an embodiment of this disclosure, the spot size conversion apparatus 30 includes the vertical spot size converter 301 including the N geometric waveguides, the part between the any two of the N geometric waveguides is filled with the filling material, the refractive index of the filling material is less than the refractive indices of the any two adjacent geometric waveguides, and the geometric structure sizes of the N geometric waveguides gradually decrease in a same direction. Therefore, in a process in which an electromagnetic wave signal passes through the N geometric waveguides of the foregoing structure, the vertical spot size processing can be performed based on an actual requirement, to generate an electromagnetic wave signal that matches a receiving waveguide. In addition, the incident surface or the emergent surface of each of the N geometric waveguides is inclined with respect to a vertical tangent plane (a tangent plane in a direction perpendicular to a transmission direction of the electromagnetic wave signal) (that is, an incident angle or an emergent angle between the electromagnetic wave signal and any geometric waveguide is between 0 degrees and 180 degrees and is not 90 degrees). Therefore, when the electromagnetic wave signal is incident or emergent from the N geometric waveguides, a reflected signal of the electromagnetic wave signal does not return along an original path. In this way, the phenomenon that the electromagnetic wave returns is reduced, and accordingly the transmission of the original electromagnetic wave signal is not interfered with. In conclusion, according to the spot size conversion apparatus provided in this embodiment of this disclosure, spot size processing can be effectively performed on the electromagnetic wave signal, and the phenomenon that the electromagnetic wave signal returns can be reduced. In this way, coupling efficiency of the electromagnetic wave in different transmission media is improved.

In a possible implementation, when the first receiver is a first waveguide, the first waveguide comprises one or more of an optical fiber, a waveguide chip, an external waveguide, or a laser. The apparatus further includes the horizontal spot size converter 302 configured to receive a third electromagnetic wave signal output from a second waveguide and perform horizontal spot size expansion processing on the third electromagnetic wave signal, to output the first electromagnetic wave signal. The second waveguide comprises one or more of an optical fiber, a waveguide chip, an external waveguide, or a laser.

Figure 5:
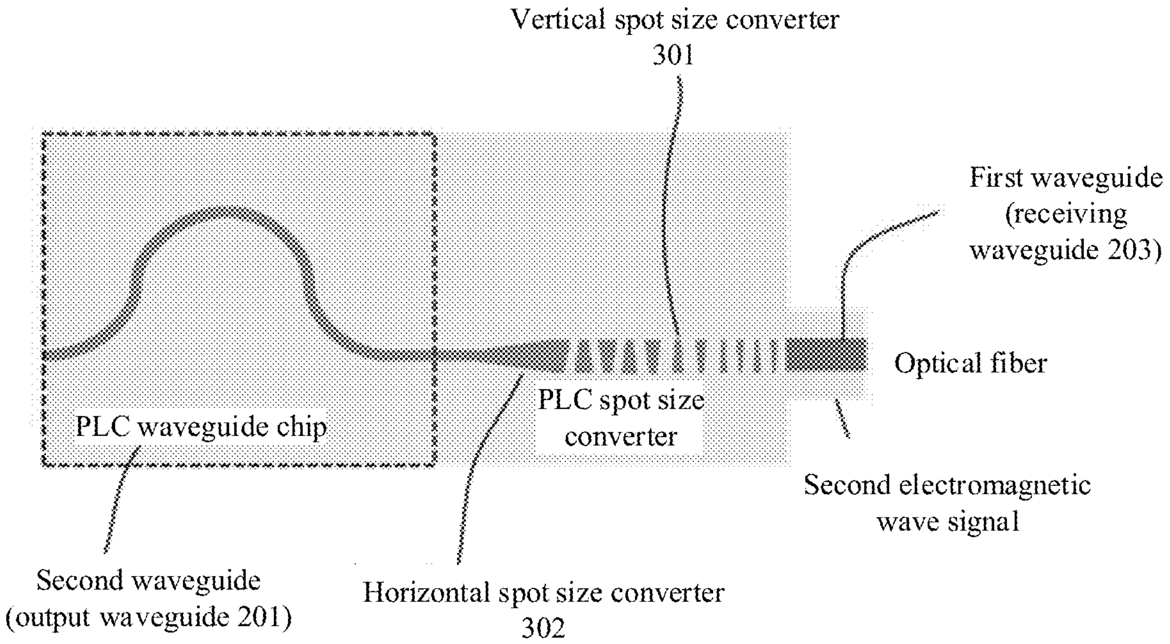
FIG. 5 is a schematic diagram of a spot size conversion scenario according to an embodiment of this disclosure.

For example, FIG. 5 is a schematic diagram of a spot size conversion scenario according to an embodiment of this disclosure. In the figure, a PLC waveguide chip and an optical fiber differ in size, therefore, an electromagnetic wave signal cannot be directly input to the optical fiber from the PLC waveguide chip, and the spot size conversion apparatus provided in this embodiment of this disclosure needs to be inserted between the two electromagnetic wave transmission media, to solve the problem of spot size conversion of the electromagnetic wave signal, so that the electromagnetic wave signal can be better coupled to the optical fiber after being output from the PLC waveguide chip. In the figure, the PLC waveguide chip is the second waveguide (output waveguide 201), the optical fiber is the first waveguide (receiving waveguide 203), a signal output from the PLC waveguide chip is the third electromagnetic wave signal, a signal output from the horizontal spot size converter 302 is the first electromagnetic wave signal, and a signal output from the vertical spot size converter 301 is the second electromagnetic wave signal. After being output from the PLC waveguide chip, the electromagnetic wave signal enters the horizontal spot size converter 302 for horizontal spot size expansion processing, and then enters the vertical spot size converter 301 for vertical spot size processing. The incident surface and the emergent surface of each of the N trapezoidal waveguides are inclined with respect to a vertical tangent plane (a tangent plane in a direction perpendicular to a transmission direction of the electromagnetic wave signal) (that is, an incident angle and an emergent angle between the electromagnetic wave signal and any trapezoidal waveguide are between 0 degrees and 180 degrees and are not 90 degrees). Therefore, when the electromagnetic wave signal is incident or emergent from the N trapezoidal waveguides, a reflected signal of the electromagnetic wave signal does not return along an original path. In this way, the phenomenon that the electromagnetic wave returns is reduced, and accordingly the transmission of the original electromagnetic wave signal is not interfered with, and coupling efficiency of the electromagnetic wave in different transmission media is improved.

Therefore, based on the foregoing description, after the corresponding vertical spot size processing is performed on the electromagnetic wave signal by using the vertical spot size converter 301, the electromagnetic wave signal is transmitted to the receiving waveguide. In this scenario, the spot size converter in this application may further include the horizontal spot size converter 302. The horizontal spot size converter 302 is configured to receive an electromagnetic wave signal output from an output waveguide, perform horizontal spot size expansion processing on the electromagnetic wave signal, and send an electromagnetic wave signal obtained after the horizontal spot size expansion processing to the vertical spot size converter 301 for vertical spot size processing, so that horizontal spot size processing and vertical spot size processing are separately performed on the electromagnetic wave signal output from the output waveguide, to generate an electromagnetic wave signal that matches a mode field of the receiving waveguide. In this way, coupling efficiency of the electromagnetic wave in different transmission media is improved.

In a possible implementation, the horizontal spot size converter 302 is a tapered waveguide whose width gradually increases in a transmission direction of the third electromagnetic wave, and the widest part of the tapered waveguide is connected to the vertical spot size converter 301.

For example, as shown in FIG. 5, the horizontal spot size converter 302 in the figure is a tapered waveguide whose width gradually increases in the transmission direction of the third electromagnetic wave signal, and the widest part of the tapered waveguide is connected to the vertical spot size converter 301. The third electromagnetic wave signal is horizontally widened along the tapered waveguide in the tapered waveguide, and the electromagnetic wave signal enters the vertical spot size converter 301.

Therefore, the horizontal spot size converter 302 is a tapered waveguide whose width gradually increases in a transmission direction of the electromagnetic wave signal output from the output waveguide. After entering the tapered waveguide, the electromagnetic wave signal is horizontally widened along a tapered structure whose width gradually increases. In addition, the widest part of the tapered waveguide is connected to the vertical spot size converter 301 to output the horizontally widened electromagnetic wave signal to the vertical spot size converter 301.

In a possible implementation, the first direction is a transmission direction of the first electromagnetic wave signal, and the vertical spot size converter 301 is configured to perform the vertical spot size expansion processing on the received first electromagnetic wave signal by using the N geometric waveguides, to generate the second electromagnetic wave signal.

Figure 6:
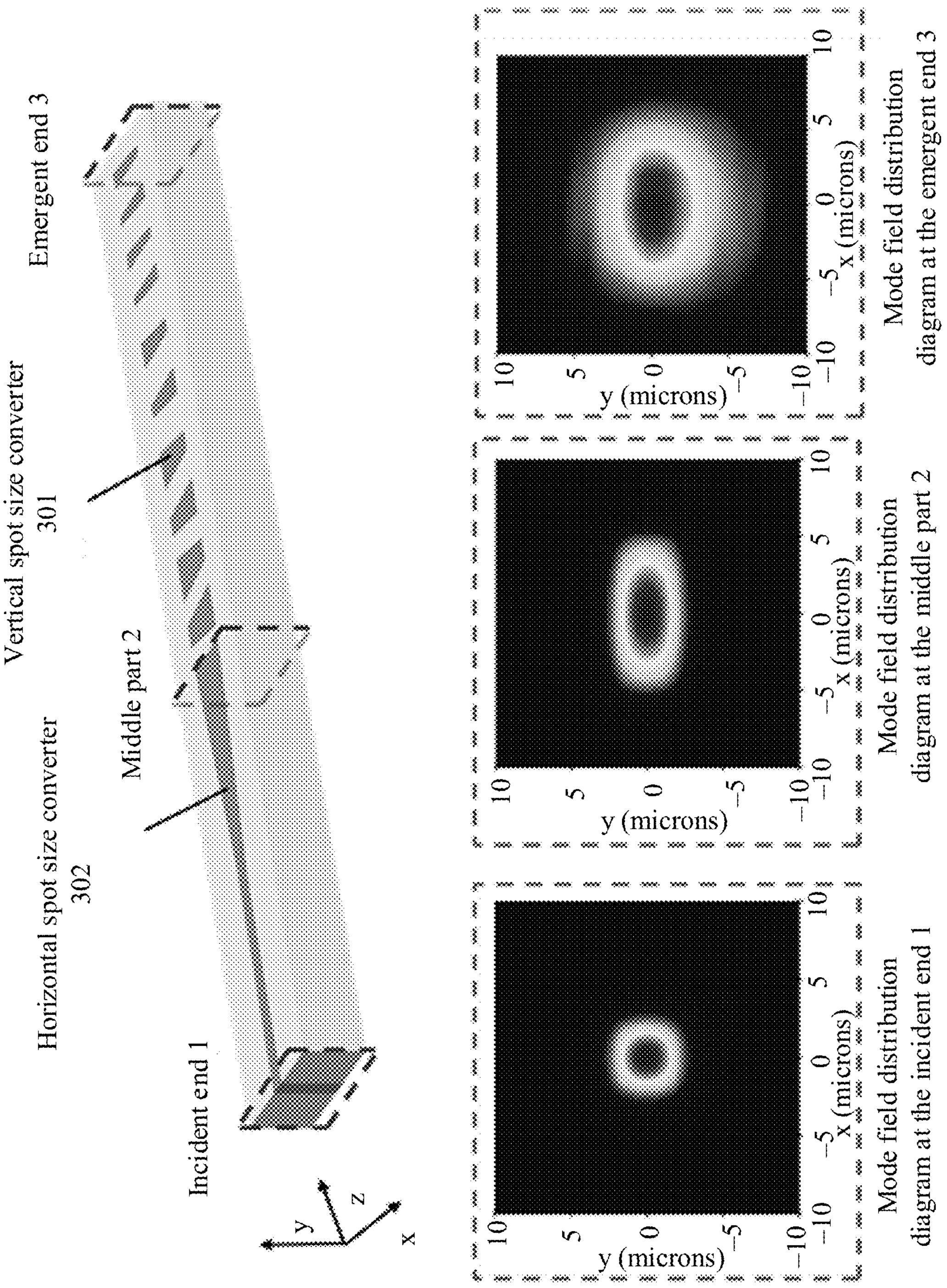
FIG. 6 is a diagram of mode field distribution along an XY cross section at different locations in a Z-axis propagation direction according to an embodiment of this disclosure.
Figure 7:
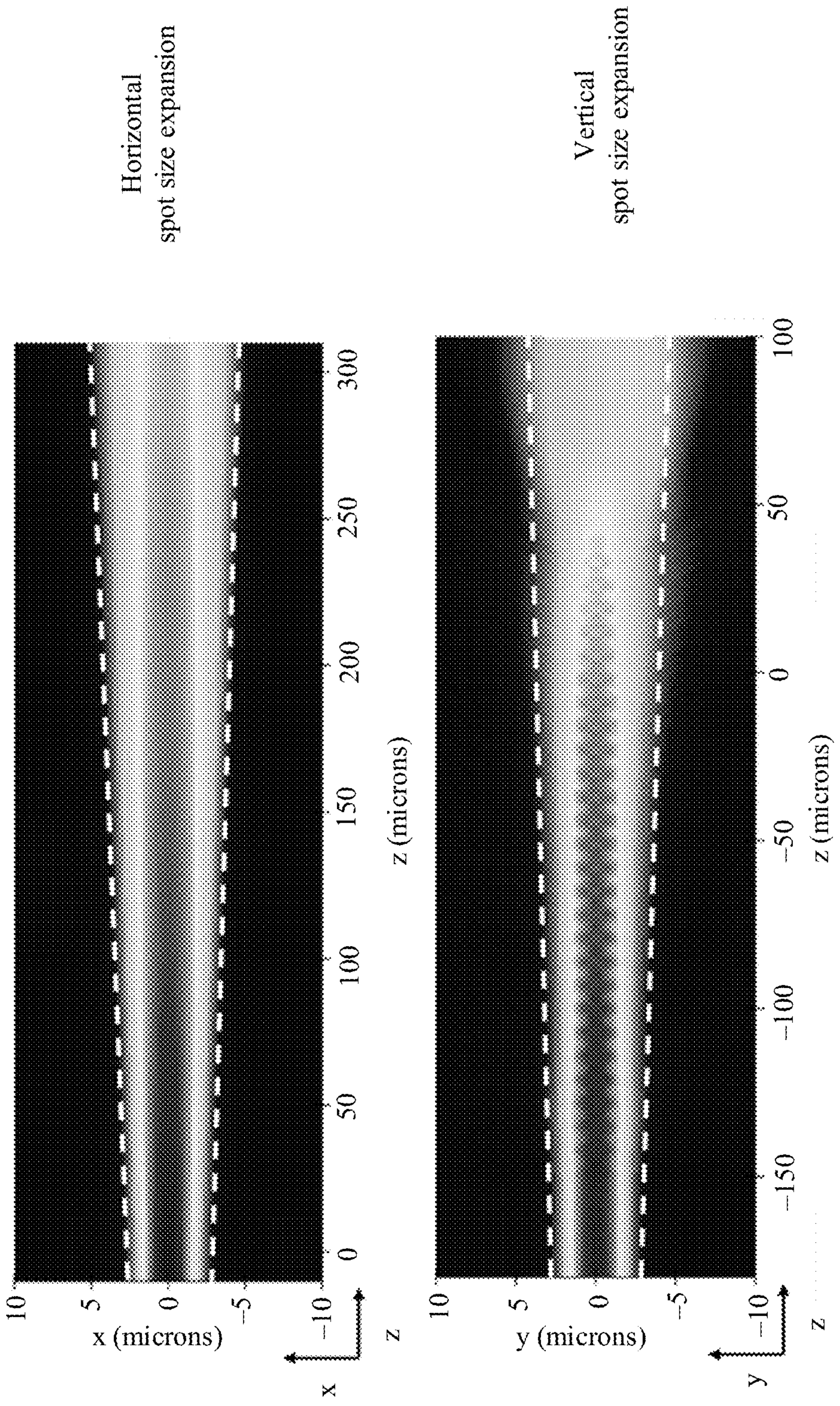
FIG. 7 is a schematic diagram of horizontal spot size expansion and vertical spot size expansion according to an embodiment of this disclosure.

For example, FIG. 6 is a diagram of a mode field distribution along an XY cross section at different locations in a Z-axis propagation direction according to an embodiment of this disclosure. In the figure, an electromagnetic wave signal is transmitted in the Z-axis direction, and the electromagnetic wave signal first passes through the horizontal spot size converter 302, and then passes through the vertical spot size converter 301. The horizontal spot size converter 302 in the figure is a tapered waveguide whose width gradually increases, and the vertical spot size converter 301 includes N trapezoidal waveguides. In FIG. 6, the mode field distribution at three locations, namely, an incident end 1, a middle part 2, and an emergent end 3, of the spot size converter is separately captured. It may be observed that in the figure, a mode field at the middle part 2 is horizontally widened with respect to that at the incident end 1, and a mode field at the emergent end 3 is vertically widened with respect to that at the middle part 2. Specifically, FIG. 7 is a schematic diagram of a horizontal spot size expansion and vertical spot size expansion according to an embodiment of this disclosure. In the figure, a horizontal mode field distribution from the incident end 1 to the middle part 2 and a vertical mode field distribution from the middle part 2 to the emergent end 3 are shown. It may be observed from FIG. 7 that in a propagation direction of the electromagnetic wave signal, there is a horizontal spot size expansion in a region from the incident end 1 to the middle part 2, and there is a vertical spot size expansion from the middle part 2 to the emergent end 3. Therefore, the horizontal spot size expansion and vertical spot size expansion are finally implemented in a region from the incident end 1 to the emergent end 3.

Figure 8:
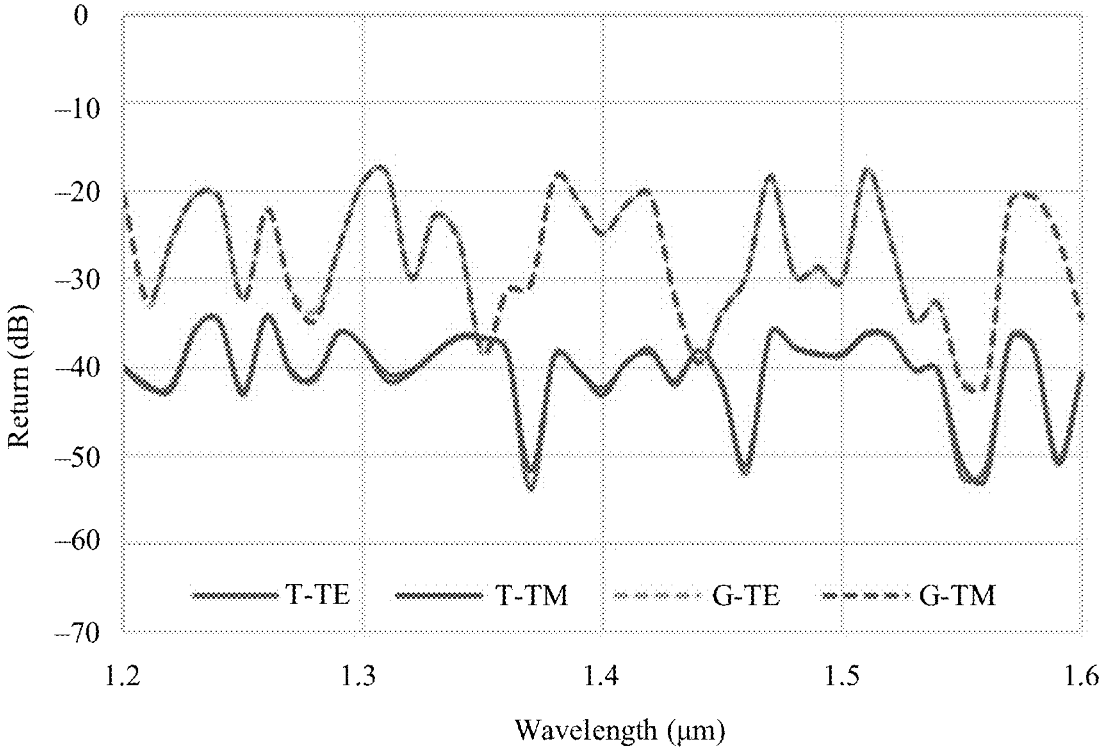
FIG. 8 is a schematic diagram of comparison between return of an electromagnetic wave according to an embodiment of this disclosure.

It should be noted that FIG. 8 is a schematic diagram of a comparison between return of an electromagnetic wave according to an embodiment of this disclosure. The electromagnetic wave return curves of the spot size conversion apparatus 30 provided in this embodiment of this disclosure and an existing non-uniform grating spot size conversion apparatus are shown in the figure. In the figure, T-TE/TM represents a return of a provided transverse electric (T TE)/transverse magnetic (TM) polarized electromagnetic wave signal in a process of propagation in the spot size conversion apparatus 30 in this application, and in the figure, G-TE/TM represents return of the TE/TM polarized electromagnetic wave in a process of propagation in the existing non-uniform grating spot size conversion apparatus. It may be clearly demonstrated, through comparison between the return curves, that in comparison with a case in which the existing non-uniform grating spot size converter is used, there is a significant decrease in the return when the spot size converter apparatus 30 provided in this embodiment of this disclosure is used. Therefore, the spot size conversion apparatus 30 provided in this disclosure has a low return characteristic.

Therefore, when the geometric feature sizes of the N geometric waveguides gradually decrease in a transmission direction of the electromagnetic wave signal obtained after the horizontal spot size expansion processing, after the vertical spot size converter 301 receives the electromagnetic wave signal obtained after the horizontal spot size processing, the electromagnetic wave signal obtained after the horizontal spot size processing passes through the N geometric waveguides, to vertical spot size expansion processing on the electromagnetic wave signal. When the electromagnetic wave signal is incident or emergent from the N geometric waveguides, a reflected signal of the electromagnetic wave signal does not return along an original path. In this way, the phenomenon that the electromagnetic wave returns is reduced, and the coupling efficiency of the electromagnetic wave in different transmission media is improved.

In a possible implementation, the first electromagnetic wave signal is received, and the first electromagnetic wave signal is output from a third waveguide. The third waveguide comprises one or more of an optical fiber, a waveguide chip, an external waveguide, or a laser. Specifically, the spot size conversion apparatus 30 in this embodiment of this disclosure may be applied to a plurality of scenarios. For example, the vertical spot size converter 301 may receive an electromagnetic wave signal output from an optical fiber, a waveguide chip, an external waveguide, or a laser, and perform corresponding vertical spot size processing on the signal.

In a possible implementation, when the first receiver is the horizontal spot size converter 302, the horizontal spot size converter 302 is configured to receive the second electromagnetic wave signal output from the vertical spot size converter 301, and perform horizontal spot size reduction processing on the second electromagnetic wave signal, to output a third electromagnetic wave signal. The third electromagnetic wave signal is received by a fourth waveguide, and the fourth waveguide comprises one or more of an optical fiber, a waveguide chip, an external waveguide, or a laser.

Figure 9:
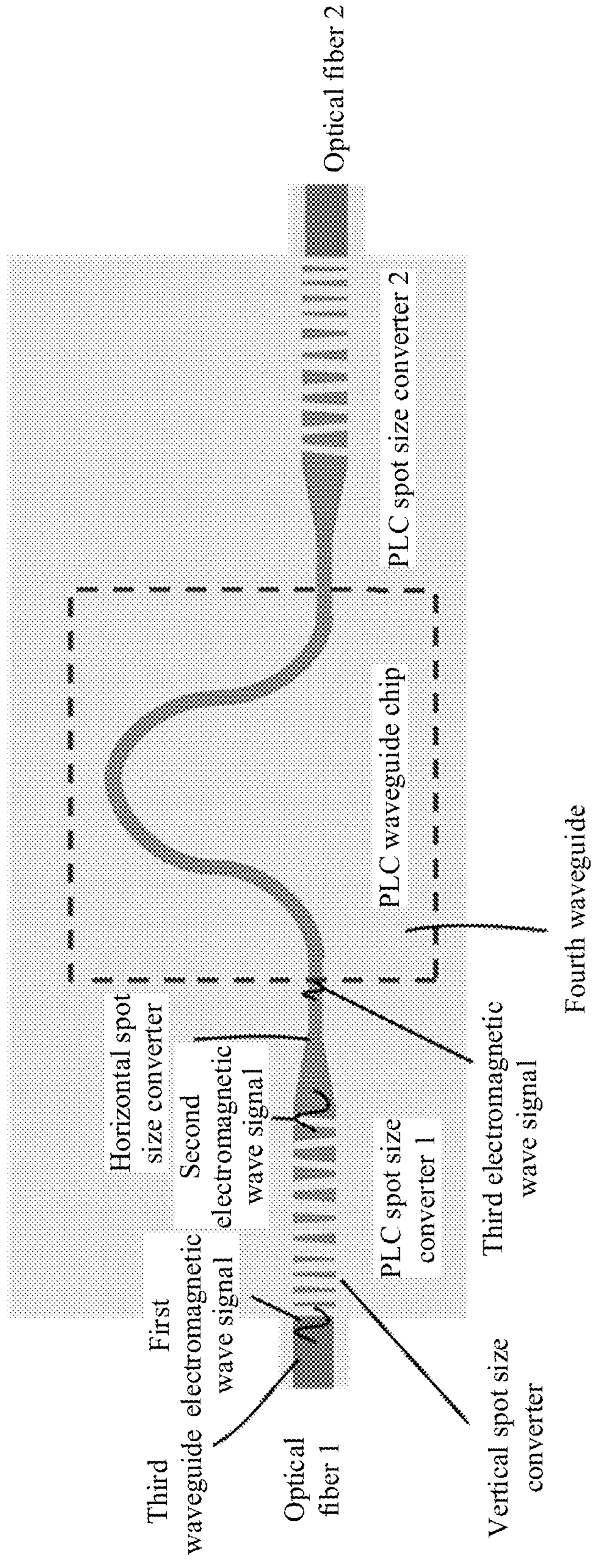
FIG. 9 is a schematic diagram of another spot size conversion scenario according to an embodiment of this disclosure.

For example, FIG. 9 is a schematic diagram of another spot size conversion scenario according to an embodiment of this disclosure. In the figure, an optical fiber 1 and a PLC waveguide chip differ in size, and therefore an electromagnetic wave signal cannot be directly input to the PLC waveguide chip from the optical fiber 1, and the spot size conversion apparatus 30 needs to be inserted between the two electromagnetic wave transmission media, to solve the problem of spot size conversion of the electromagnetic wave signal, so that the electromagnetic wave signal can be better coupled to the PLC waveguide chip after being output from the optical fiber 1. In the figure, the optical fiber 1 is the third waveguide (output waveguide 201), the PLC waveguide chip is the fourth waveguide (receiving waveguide 203), a signal output from the optical fiber 1 is the first electromagnetic wave signal, a signal output from the vertical spot size converter is the second electromagnetic wave signal, and a signal output from the horizontal spot size converter is the third electromagnetic wave signal. After being output from the optical fiber 1, the electromagnetic wave signal enters the vertical spot size converter for vertical spot size processing, and then enters the horizontal spot size converter for horizontal spot size reduction processing.

Therefore, based on the foregoing description, after the corresponding vertical spot size processing is performed on the electromagnetic wave signal by using the vertical spot size converter 301, the electromagnetic wave signal is transmitted to the horizontal spot size converter 302. In this scenario, the horizontal spot size converter 302 may be further configured to receive the electromagnetic wave signal obtained after the vertical spot size processing, perform horizontal spot size reduction processing on the electromagnetic wave signal, and send an electromagnetic wave signal obtained after the horizontal spot size reduction processing to the receiving waveguide 203, so that the vertical spot size processing and horizontal spot size processing are separately performed on the electromagnetic wave signal output from the output waveguide 201, to generate an electromagnetic wave signal that matches a mode field of the receiving waveguide. In this way, the coupling efficiency of the electromagnetic wave in different transmission media is improved.

In a possible implementation, the horizontal spot size converter 302 is a tapered waveguide whose width gradually decreases in a transmission direction of the second electromagnetic wave, and the widest part of the tapered waveguide is connected to the vertical spot size converter 301.

For example, as shown in FIG. 9, the horizontal spot size converter 302 in the figure is a tapered waveguide whose width gradually decreases in the transmission direction of the second electromagnetic wave signal, and the widest part of the tapered waveguide is connected to the vertical spot size converter 301. Horizontal spot size reduction is performed on the second electromagnetic wave signal along the tapered waveguide in the tapered waveguide, and then the electromagnetic wave signal enters the PLC waveguide chip.

Therefore, the horizontal spot size converter 302 may be a tapered waveguide whose width gradually decreases in a transmission direction of the electromagnetic wave signal obtained after the vertical spot size processing. After the electromagnetic wave signal enters the tapered waveguide, the corresponding horizontal spot size reduction is performed along a tapered structure whose width gradually decreases. In addition, the widest part of the tapered waveguide is connected to the vertical spot size converter 301, to receive the electromagnetic wave signal that is obtained after the vertical processing and that is output from the vertical spot size converter 301.

In a possible implementation, the first direction is an opposite direction of a transmission direction of the first electromagnetic wave signal, and the vertical spot size converter 301 is configured to perform the vertical spot size reduction processing on the received first electromagnetic wave signal by using the N geometric waveguides, to generate the second electromagnetic wave signal.

For example, as shown in FIG. 9, after being output from the optical fiber 1, the electromagnetic wave signal first enters a trapezoidal waveguide with the smallest geometric feature size in the vertical spot size converter 301, and then passes through geometric waveguides whose geometric sizes gradually increase for vertical spot size reduction processing. The incident surface and the emergent surface of each of the N trapezoidal waveguides are inclined with respect to a vertical tangent plane (a tangent plane in a direction perpendicular to a transmission direction of the electromagnetic wave signal) (that is, an incident angle and an emergent angle between the electromagnetic wave signal and any trapezoidal waveguide are between 0 degrees and 180 degrees and are not 90 degrees). Therefore, when the electromagnetic wave signal is incident or emergent from the N trapezoidal waveguides, a reflected signal of the electromagnetic wave signal does not return along an original path. In this way, the phenomenon that the electromagnetic wave returns is reduced, and accordingly the transmission of the original electromagnetic wave signal is not interfered with, and the coupling efficiency of the electromagnetic wave in different transmission media is improved.

Therefore, when the geometric feature sizes of the N geometric waveguides gradually increase in a transmission direction of the electromagnetic wave signal output from the output waveguide, after the vertical spot size converter 301 receives the electromagnetic wave signal output from the output waveguide 201, the electromagnetic wave signal passes through the N geometric waveguides, to perform vertical spot size reduction processing on the electromagnetic wave signal, and when the electromagnetic wave signal is incident or emergent from the N geometric waveguides, a reflected signal of the electromagnetic wave signal does not return along an original path. In this way, the phenomenon that the electromagnetic wave returns is reduced, and the coupling efficiency of the electromagnetic wave in different transmission media is improved.

In a possible implementation, the thicknesses of the horizontal spot size converter 302 and the vertical spot size converter 301 are the same. Specifically, the horizontal spot size converter 302 may perform horizontal spot size processing on the electromagnetic wave, the vertical spot size converter 301 may perform vertical spot size processing on the electromagnetic wave, and the horizontal spot size converter 302 and the vertical spot size converter 301 have the same thickness. In this way, the spot size conversion apparatus 30 provided in this embodiment of this disclosure can perform spot size processing on the electromagnetic wave signal, and the horizontal spot size converter 302 and the vertical spot size converter 301 may be manufactured by using a same semiconductor process, to reduce manufacturing complexity.

Figure 10:
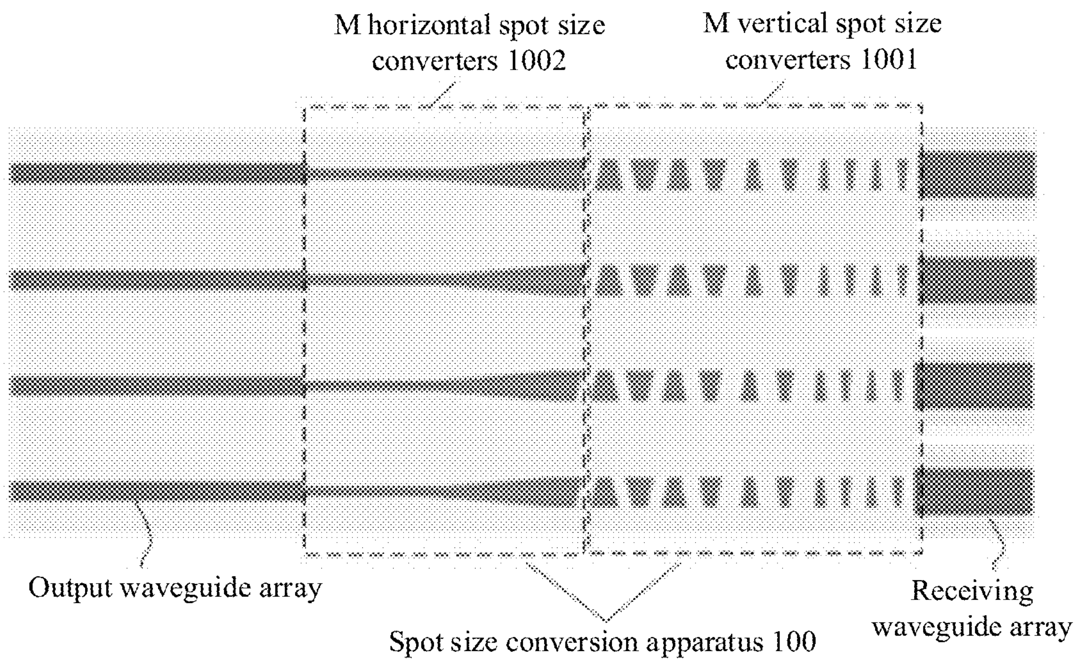
FIG. 10 is a diagram of a structure of another spot size conversion apparatus according to an embodiment of this disclosure.

FIG. 10 is a diagram of a structure of another spot size conversion apparatus according to an embodiment of this disclosure. As shown in FIG. 10, the spot size conversion apparatus 100 includes M vertical spot size converters 1001, and optionally, may further include M horizontal spot size converters 1002.

Each of the M vertical spot size converters 1001 is the vertical spot size converter 301 according to any one of the foregoing implementations, and each of the M horizontal spot size converters 1002 is the horizontal spot size converter 302 according to any one of the foregoing implementations. Specifically, the spot size conversion apparatus 100 may include a plurality of horizontal spot size converters 302 and a plurality of vertical spot size converters 301, and may simultaneously perform, based on an actual requirement, corresponding spot size processing on a plurality of electromagnetic wave signals output from an output waveguide array. In this way, the coupling efficiency of the electromagnetic wave in different transmission media is improved. For example, as shown in FIG. 10, in the figure, when M is equal to 4, the output waveguide array includes four output waveguides, a receiving waveguide array includes four receiving waveguides, and each output waveguide and each receiving waveguide are connected by using a structure of a combination of the horizontal spot size converter and the vertical spot size converter provided in embodiments of this disclosure, so that the spot size conversion apparatus can simultaneously perform corresponding spot size processing on four electromagnetic wave signals output from the output waveguide array. In this way, the coupling efficiency of the electromagnetic wave in different transmission media is improved.

Embodiments of the apparatus of this disclosure are described above in detail. Embodiments o related methods of this disclosure are provided below.

An embodiment of this disclosure provides a spot size conversion method. The method may include: a vertical spot size converter receives a first electromagnetic wave signal, performs vertical spot size processing on the first electromagnetic wave signal by using N geometric waveguides to output a second electromagnetic wave signal, and sends the second electromagnetic wave signal to a first receiver. The vertical spot size processing includes vertical spot size expansion processing or vertical spot size reduction processing. The vertical spot size converter includes the N geometric waveguides. A part between any two adjacent geometric waveguides is filled with a filling material. Each of the N geometric waveguides includes an incident surface and an emergent surface. A refractive index of the filling material is less than the refractive indices of the two adjacent geometric waveguides. The geometric feature sizes between respective incident surfaces and respective emergent surfaces of the N geometric waveguides gradually decrease in a first direction. An angle range of an incident angle or an emergent angle between the first electromagnetic wave signal and a first geometric waveguide in the N geometric waveguides is a first range. An angle range of an incident angle or an emergent angle between an electromagnetic wave signal output from each geometric waveguide and a next geometric waveguide is the first range. The first range is between 0 degrees and 180 degrees and is not 90 degrees.

In a possible implementation, when the first receiver is a first waveguide, the first waveguide comprises one or more of an optical fiber, a waveguide chip, an external waveguide, or a laser, and the method further includes: a horizontal spot size converter receives a third electromagnetic wave signal output from a second waveguide, and performs horizontal spot size expansion processing on the third electromagnetic wave signal to output the first electromagnetic wave signal. The second waveguide comprises one or more of an optical fiber, a waveguide chip, an external waveguide, or a laser.

In a possible implementation, the horizontal spot size converter is a tapered waveguide whose width gradually increases in a transmission direction of the third electromagnetic wave, and the widest part of the tapered waveguide is connected to the vertical spot size converter.

In a possible implementation, the first direction is a transmission direction of the first electromagnetic wave signal, and the method includes: The vertical spot size converter gradually performs the vertical spot size expansion processing on the received first electromagnetic wave signal by using the N geometric waveguides, to generate the second electromagnetic wave signal.

In a possible implementation, the first electromagnetic wave signal is received, and the first electromagnetic wave signal is output from a third waveguide. The third waveguide comprises one or more of an optical fiber, a waveguide chip, an external waveguide, or a laser.

In a possible implementation, when the first receiver is a horizontal spot size converter, the method includes: the horizontal spot size converter receives the second electromagnetic wave signal output from the vertical spot size converter, and performs horizontal spot size reduction processing on the second electromagnetic wave signal to output a third electromagnetic wave signal. The third electromagnetic wave signal is received by a fourth waveguide, and the fourth waveguide comprises one or more of an optical fiber, a waveguide chip, an external waveguide, or a laser.

In a possible implementation, the horizontal spot size converter is a tapered waveguide whose width gradually decreases in a transmission direction of the second electromagnetic wave, and the widest part of the tapered waveguide is connected to the vertical spot size converter.

In a possible implementation, the first direction is an opposite direction of a transmission direction of the first electromagnetic wave signal, and the method includes: the vertical spot size converter gradually performs the vertical spot size reduction processing on the received first electromagnetic wave signal by using the N geometric waveguides, to generate the second electromagnetic wave signal.

In a possible implementation, the thicknesses of the horizontal spot size converter and the vertical spot size converter are the same.

It should be noted that the steps of the spot size conversion method described in this embodiment of this disclosure are implemented in the spot size conversion apparatus in the apparatus embodiment. Details are not described herein.

An embodiment of this disclosure further provides a semiconductor chip, including the spot size conversion apparatus according to any one of the foregoing implementations.

An embodiment of this disclosure further provides a terminal device, including the spot size conversion apparatus according to any one of the foregoing implementations.

In the foregoing embodiments, each embodiment is described by focusing on a different aspect. For a part that is not described in detail in an embodiment, refer to the related description in another embodiment.

It should be noted that for brief description, the foregoing method embodiments are represented as a series of actions. However, persons skilled in the art should appreciate that this application is not limited to the described order of the actions, because according to this application, some steps may be performed in other orders or simultaneously. It should be further appreciated by persons skilled in the art that all of embodiments described in this specification are example embodiments, and the involved actions and modules are not necessarily required by this application.

In the several embodiments provided in this application, it should be understood that the disclosed apparatus may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic or other forms.

The foregoing units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in embodiments of this application may be integrated into one processing unit, each of the units may exist alone physically, or two or more units may be integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to the conventional technology, or all or some of the technical solutions may be implemented in a form of a software product. The computer software product is stored in a storage medium and includes several instructions for instructing a computer device (which may be a personal computer, a server, a network device, or the like, and may be specifically a processor in the computer device) to perform all or some of the steps of the method described in embodiments of this application. The storage medium includes any medium that can store program code, for example, a USB flash drive, a removable hard disk, a magnetic disk, an optical disc, a read-only memory (ROM), or a random access memory (RAM).

The foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of embodiments of this application.

What is claimed is:

1. A spot size conversion apparatus, comprising:

a vertical spot size converter comprising N geometric waveguides, a space between any two adjacent geometric waveguides is filled with a filling material, each of the N geometric waveguides comprises an incident surface and an emergent surface, a refractive index of the filling material is less than refractive indices of the any two adjacent geometric waveguides, and geometric feature sizes between respective incident surfaces and respective emergent surfaces of the N geometric waveguides decrease in a first direction, wherein no two incident surfaces are parallel; and the vertical spot size converter is configured to:

perform vertical spot size processing on a first electromagnetic wave signal by using the N geometric waveguides to output a second electromagnetic wave signal into a first receiver, wherein the vertical spot size processing comprises vertical spot size expansion or vertical spot size reduction, wherein an angle range of an incident angle or an emergent angle between the first electromagnetic wave signal and a first geometric waveguide in the N geometric waveguides is a first range, an incident angle or an emergent angle between an electromagnetic wave signal output from each geometric waveguide and a next geometric waveguide are the same and an angle range of the incident angle or the emergent angle between the electromagnetic wave signal output from each geometric waveguide and the next geometric waveguide is the first range, and the first range is between 0 degrees and 180 degrees and not 90 degrees;

wherein the first receiver comprises a horizontal spot size converter comprising a tapered waveguide whose widest part is connected to the vertical spot size converter and whose width decreases in a transmission direction of the second electromagnetic wave.

2. The apparatus according to claim 1, wherein the first receiver comprises one or more of an optical fiber, a waveguide chip, or an external waveguide.

3. The apparatus according to claim 1, wherein the vertical spot size converter is configured to:

perform the vertical spot size expansion processing on the received first electromagnetic wave signal to generate the second electromagnetic wave signal.

4. The apparatus according to claim 1, further comprising a third waveguide comprising one or more of an optical fiber, a waveguide chip, or an external waveguide, wherein the first electromagnetic wave signal is received by the vertical spot size converter from the third waveguide.

5. The apparatus according to claim 4, further comprising a fourth waveguide comprising one or more of an optical fiber, a waveguide chip, or an external waveguide, wherein the fourth waveguide is configured to receive the second electromagnetic wave from the horizontal spot size converter.

6. The apparatus according to claim 1, wherein thicknesses of the horizontal spot size converter and the vertical spot size converter are the same.

7. The apparatus according to claim 1, wherein no two emergent surfaces are parallel.

8. A spot size conversion method, comprising receiving, by a vertical spot size converter, a first electromagnetic wave signal, wherein the vertical spot size converter includes N geometric waveguides, a space between any two adjacent geometric waveguides is filled with a filling material, each of the N geometric waveguides comprises an incident surface and an emergent surface, a refractive index of the filling material is less than refractive indices of the any two adjacent geometric waveguides, and geometric feature sizes between respective incident surfaces and respective emergent surfaces of the N geometric waveguides decrease in a first direction, wherein no two incident surfaces are parallel;

performing vertical spot size processing on the first electromagnetic wave signal by using the N geometric waveguides, to output a second electromagnetic wave signal; and sending the second electromagnetic wave signal to a first receiver comprising a horizontal spot size converter including a tapered waveguide whose widest part is connected to the vertical spot size converter and whose width decreases in a transmission direction of the second electromagnetic wave;

wherein the vertical spot size processing comprises vertical spot size expansion or vertical spot size reduction, an angle range of an incident angle or an emergent angle between the first electromagnetic wave signal and a first geometric waveguide in the N geometric waveguides is a first range, an angle range of an incident angle and an emergent angle between an electromagnetic wave signal output from each geometric waveguide and a next geometric waveguide are the same and an angle range of the incident angle or the emergent angle between the electromagnetic wave signal output from each geometric waveguide and the next geometric waveguide is the first range, and the first range is between 0 degrees and 180 degrees and not 90 degrees;

wherein the first receiver comprises a horizontal spot size converter comprising a tapered waveguide whose widest part is connected to the vertical spot size converter and whose width decreases in a transmission direction of the second electromagnetic wave.

9. The method according to claim 8, wherein the first receiver comprises one or more of an optical fiber, a waveguide chip, an external waveguide.

10. The method according to claim 8, wherein the method comprises:

performing, by the vertical spot size converter, the vertical spot size expansion processing on the received first electromagnetic wave signal to generate the second electromagnetic wave signal.

11. The method according to claim 8, wherein the first electromagnetic wave signal is received by the vertical spot size converter from a third waveguide including one or more of an optical fiber, a waveguide chip, or an external waveguide.

12. The method according to claim 11, wherein the method further comprises:

receiving, by the horizontal spot size converter, the second electromagnetic wave signal output from the vertical spot size converter and performing horizontal spot size reduction processing on the second electromagnetic wave signal, to output a third electromagnetic wave signal, wherein the third electromagnetic wave signal is received by a fourth waveguide comprising one or more of an optical fiber, a waveguide chip, or an external waveguide.

13. The method according to claim 8, wherein thicknesses of the horizontal spot size converter and the vertical spot size converter are the same.

14. The method according to claim 8, wherein no two emergent surfaces are parallel.

15. A terminal, comprising:

a spot size converter including N geometric waveguides, a space between any two adjacent geometric waveguides is filled with a filling material, each of the N geometric waveguides comprises an incident surface and an emergent surface, a refractive index of the filling material is less than refractive indices of the any two adjacent geometric waveguides, and geometric feature sizes between respective incident surfaces and respective emergent surfaces of the N geometric waveguides decrease in a first direction, wherein no two incident surfaces are parallel; and the vertical spot size converter is configured to:

perform vertical spot size processing on a first electromagnetic wave signal by using the N geometric waveguides to output a second electromagnetic wave signal into a first receiver, wherein the vertical spot size processing comprises vertical spot size expansion or vertical spot size reduction, wherein an angle range of an incident angle or an emergent angle between the first electromagnetic wave signal and a first geometric waveguide in the N geometric waveguides is a first range, an angle range of an incident angle and an emergent angle between an electromagnetic wave signal output from each geometric waveguide and a next geometric waveguide are the same and an angle range of the incident angle or the emergent angle between the electromagnetic wave signal output from each geometric waveguide and the next geometric waveguide is the first range, and the first range is between 0 degrees and 180 degrees and is not 90 degrees;

wherein the first receiver comprises a horizontal spot size converter is a tapered waveguide whose widest part is connected to the vertical spot size converter and whose width decreases in a transmission direction of the second electromagnetic wave.

16. The terminal according to claim 15, wherein the first receiver comprises one or more of an optical fiber, a waveguide chip, an external waveguide, or a laser; and the terminal further comprises:

a second waveguide comprising one or more of an optical fiber, a waveguide chip, or an external waveguide wherein the horizontal spot size converter is disposed between the second waveguide and the vertical spot size converter.

17. The terminal according to claim 15, wherein no two emergent surfaces are parallel.

18. The terminal according to claim 15, wherein the vertical spot size converter is configured to:

perform the vertical spot size expansion processing on the received first electromagnetic wave signal to generate the second electromagnetic wave signal.

19. The terminal according to claim 15, further comprising a third waveguide comprising one or more of an optical fiber, a waveguide chip, or an external waveguide, wherein the first electromagnetic wave signal is received by the vertical spot size converter from the third waveguide.

20. The terminal according to claim 15, wherein thicknesses of the horizontal spot size converter and the vertical spot size converter are the same.

* * * * *